US006227037B1

(12) United States Patent
Kawamura et al.

(10) Patent No.: US 6,227,037 B1
(45) Date of Patent: May 8, 2001

(54) DIAGNOSIS FOR EVAPORATIVE EMISSION CONTROL SYSTEM

(75) Inventors: Katsuhiko Kawamura; Akihiro Kawano, both of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/285,261

(22) Filed: Apr. 2, 1999

(30) Foreign Application Priority Data

Apr. 17, 1998 (JP) ........................................ 10-107856

(51) Int. Cl.[7] ........................................ G01M 3/26

(52) U.S. Cl. ........................ 73/49.7; 73/40; 73/40.5 R; 73/49.5 R; 73/49.2; 73/49.7; 73/118.1; 123/518; 123/519; 123/520

(58) Field of Search ........................ 73/40, 40.5 R, 73/49.2, 118.1; 123/518, 519, 520; 701/31

(56) References Cited

U.S. PATENT DOCUMENTS 5,146,902 * 9/1992 Cook et al. .................... 123/518
5,408,866 * 4/1995 Kawamura et al. ................ 73/40
5,467,641 * 11/1995 Williams et al. ............... 73/49.7
5,560,243 * 10/1996 Wild .......................... 73/118.1
5,606,121 * 2/1997 Blomquist et al. ............... 73/118.1
5,637,788 * 6/1997 Remboski et al. ................ 73/40 R
5,675,073 * 10/1997 Otsuka ........................ 73/40.5 R
5,726,354 * 3/1998 Nomura et al. .................. 73/118.1
5,731,514 * 3/1998 Miwa et al. .................... 73/118.1
5,739,421 4/1998 Iochi et al. ...................... 73/49.7
5,750,888 * 5/1998 Matsumoto et al. ............... 73/118.1
5,898,103 * 4/1999 Denz et al. .................... 73/49.2
5,957,115 * 9/1999 Busato et al. .................. 123/520
6,016,690 * 1/2000 Cook et al. .................... 73/49.2
6,073,487 * 6/2000 Dawson ......................... 73/118.1
6,089,081 * 7/2000 Cook et al. .................... 73/118.1

* cited by examiner

*Primary Examiner*—Hezron Williams
*Assistant Examiner*—Charles D Garber
(74) *Attorney, Agent, or Firm*—Foley & Lardner

(57) ABSTRACT

At the time of a stop of an engine, a diagnostic control unit shuts off a purge line with a purge control valve and an atmospheric port of a canister with a drain cut valve, and thereby holds an evaporative emission control circuit inclusive of a fuel tank and the canister in a state of a closed space during an off period of the engine. At the time of a next start of the engine, the diagnostic control unit measures a pressure in the closed circuit with a pressure sensor and checks a pressure decrease due to condensation of fuel vapors in the closed circuit to determine the existence or nonexistence of leakage.

15 Claims, 5 Drawing Sheets

DIAGNOSIS FOR EVAPORATIVE EMISSION CONTROL SYSTEM

BACKGROUND OF THE INVENTION

The present invention relates to diagnostic technique for an evaporative emission control system, and in particular to diagnostic systems and methods for detecting leakage in an evaporative emission control fluid circuit for a vehicle.

An evaporative emission control system mounted on a vehicle is designed to prevent the escape of gasoline vapors to the atmosphere by using a canister filled with activated carbon or charcoal. While the engine is out of operation, the fuel vapors are directed through tubing to the canister, and the activated carbon or charcoal adsorbs the fuel vapors. When the engine starts, a purge line or passage is opened under a predetermined engine operating condition, and fresh air is drawn through the canister by the action of engine vacuum. The flow of the fresh air removes the fuel vapors from the carbon and carries the fuel vapors to the intake passage downstream of the throttle valve, so that they are burned in the engine.

A Japanese Patent Kokai Publication No. 7(1995)-139439 discloses a diagnostic system for performing a leak diagnosis to detect leakage in such an evaporative emission control system.

SUMMARY OF THE INVENTION

It is an object of the present invention to provide diagnostic system and method enabling a leak diagnosis without delay after a start of the engine, and reducing a disturbance in the air fuel ratio due to the diagnosis.

According to the present invention, a diagnostic apparatus for an evaporative emission control system comprises:

a first passage conveying evaporative fuel vapor from a fuel tank to a canister;

a second passage extending between the canister and an intake passage section downstream of a throttle valve;

a valve system;

a pressure sensor sensing a pressure in a fluid passage from the fuel tank to the second passage;

a controller holding the fluid passage from the fuel tank to the second passage in a state of a closed space by controlling the valve system when an engine is out of operation, and performing a leak diagnosis by checking a pressure decrease due to condensation of the fuel vapor in the fluid passage held in the state of a closed space when the engine is started.

In an illustrated preferred embodiment of the present invention, the valve system comprises a purge control valve opening and closing the second passage, and a drain cut valve opening and closing an atmospheric port of the canister.

According to the present invention, a diagnostic process for an evaporative emission control system comprises:

holding a fuel vapor recovery passage extending from the fuel tank through the canister to the second passage in a closed state to confine fuel vapor in the fuel vapor recovery passage during an off period of the engine; and detecting leakage in the fuel vapor recovery passage at an end of the off period by checking a pressure decrease in the fuel vapor recovery passage held in the closed state during the off period.

DETAILED DESCRIPTION OF THE INVENTION

Figure 1:
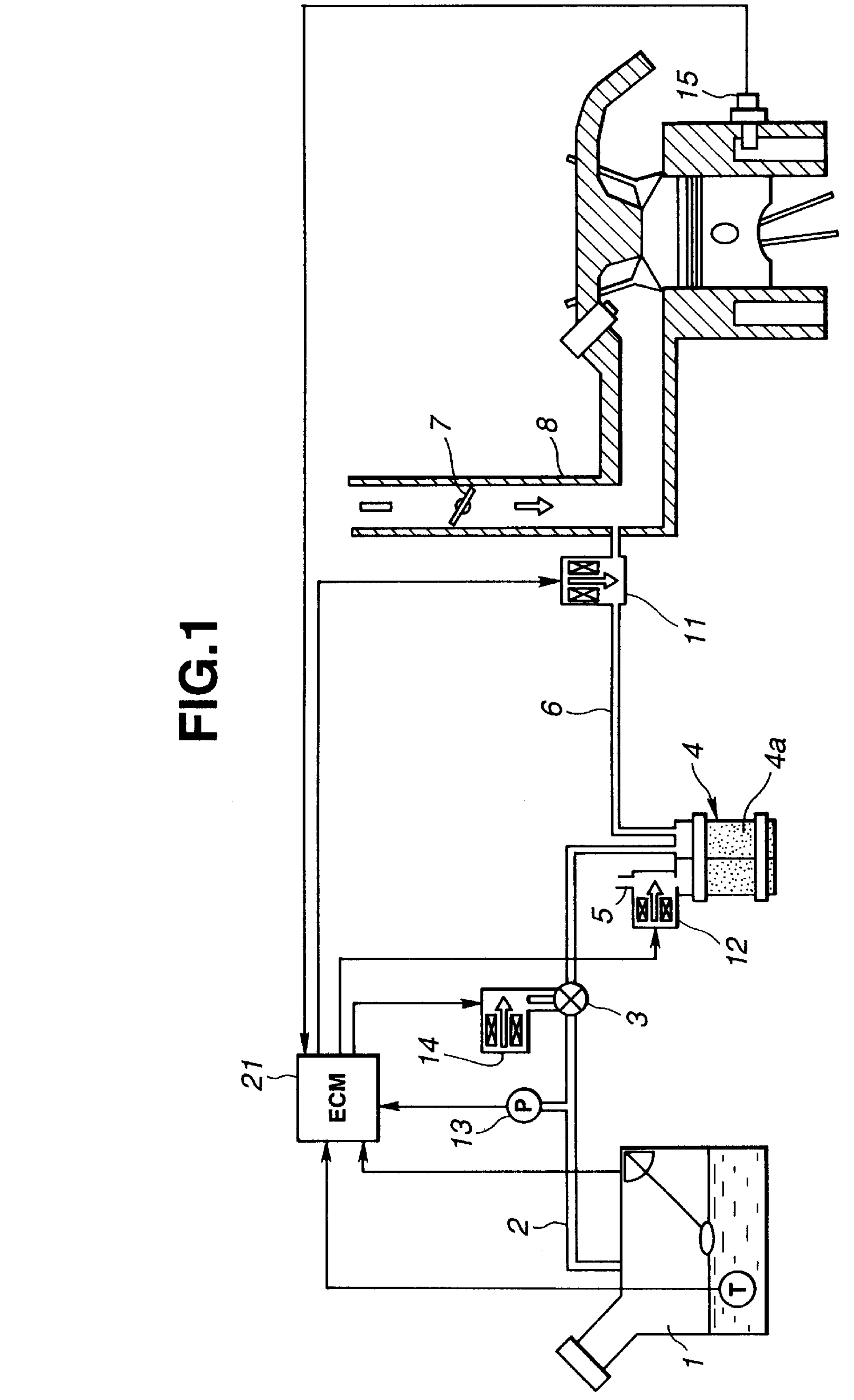
FIG. 1 is a schematic view showing an evaporative emission control system according to one embodiment of the present invention.

FIG. 1 shows an evaporative emission control system according to one embodiment of the present invention. This system is for a motor vehicle.

A fluid line or passage (first passage) 2 extends from a fuel tank 1 to a canister 4. Fuel vapor (contained in air) in the upper part of the fuel tank 1 is conveyed from the fuel tank 1 through the fluid passage 2 to the canister 4. In the canister 4, the fuel vapor or fuel particles are trapped or adsorbed by activated carbon or charcoal **4*a* in the canister 4 whereas the remaining air is discharged to the outside through an atmospheric port 5 (formed at the bottom of the canister 4 through shown at the top of the canister 4 in FIG. 1**).

Figure 2:
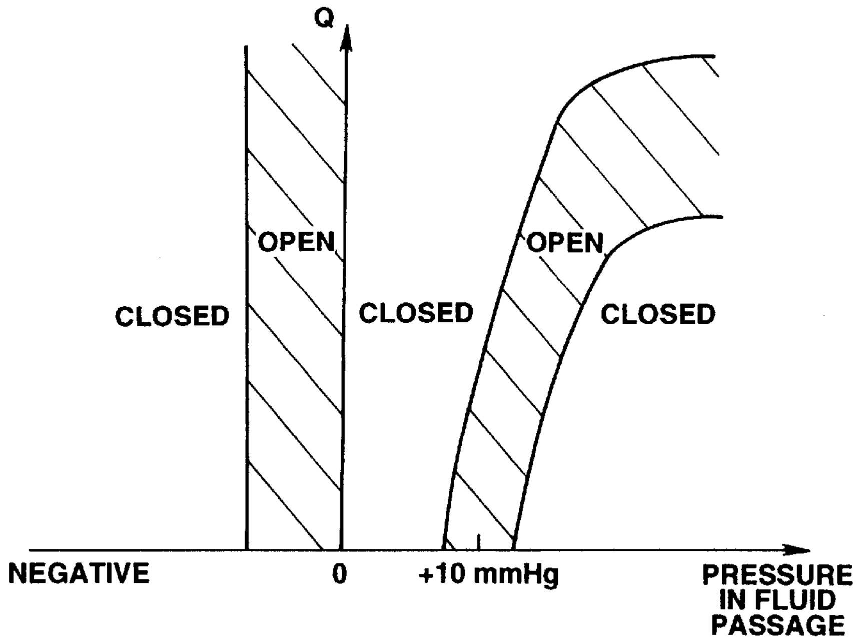
FIG. 2 is a graph showing a flow characteristic of a vacuum cut valve 3 shown in FIG. 1.

A mechanical vacuum cut valve 3 is disposed in the fluid passage 2. The vacuum cut valve 3 is opened when the pressure on the fuel tank's side becomes lower than the atmospheric pressure. As shown in FIG. 2, the vacuum cut valve 3 is opened when the fluid pressure on the fuel tank's side becomes equal to a predetermined pressure (+10 mm Hg, for example) because of generation of the fuel vapor in the fuel tank 1. In FIG. 2, the atmospheric pressure is a reference pressure (0 mm Hg), the plus sign indicates that the pressure is higher than the atmospheric pressure, and the minus sign indicates subatmospheric pressures.

A purge line or passage (second passage) 6 extends from the canister 4 to an intake passage (or pipe) section 8 downstream of a throttle valve 7.

A purge control valve 11 is disposed in the purge passage 6. The purge control valve 11 of this example is a normally closed valve driven by a stepper motor. Under a predetermined condition (in a low load region after a warm-up operation, for example), the purge control valve 11 opens in response to a control signal supplied from a control unit 21 (engine control module ECM). In the open state of the purge control valve 11, an intake manifold vacuum developed on the downstream side of the throttle valve 7 draws fresh air from the atmospheric port 5 into the canister 4. The fresh air picks up the fuel vapor from the activated charcoal **4*a* and carries the fuel vapor through the purge passage 6** into the intake pipe sections to be burned in a combustion chamber of the engine.

In a comparable example, a leak diagnostic system is arranged to detect leakage of fuel vapor to the atmosphere through a leak hole or malfunction of sealing in a pipe joint in an evaporative emission control circuit, by setting the fluid pressure in the circuit on the negative side by using the negative pressure on the downstream side of the throttle valve.

In this case, the suction of the air mixed with the fuel vapor into the intake pipe by the intake manifold negative pressure disturbs the air fuel ratio of the engine. Therefore, the diagnostic system of this comparable example performs the leak detecting diagnosis during a feedback air fuel ratio control operation. The feedback air fuel ratio control system is designed to control the actual air fuel ratio within a predetermined narrow window around the theoretical air fuel ratio, in accordance with the output of an oxygen sensor provided on the upstream side of a three way catalytic converter in the exhaust passage. The feedback control system can reduce the disturbance in the air fuel ratio due to the introduction of the fuel vapor into the intake passage.

However, the response speed of the feedback control system is not so high, and the conversion efficiency of the catalytic converter is lower than its highest conversion level for a period starting from an occurrence of a disturbance up to settlement of the air fuel ration within a range around the theoretical-ratio. Moreover, the feedback control requires activation of the oxygen sensor, and the diagnostic system is unable to start the diagnosis for a period of time from a start of the engine until the feedback control is properly started.

The diagnostic system according to the embodiment of the present invention utilizes a negative pressure due to condensation of vapor fuel during an off period of the engine.

A drain cut valve 12 is a normally open valve provided at the atmospheric port 5 of the canister 4 to close off the fluid passage (or evaporative fuel vapor recovery passage) from the fuel tank 1 to the purge control valve 11 in a form of a closed space.

A bypass valve 14 is a normally closed valve arranged in parallel to the vacuum cut valve 3.

The purge control valve 11, the drain cut valve 12 and the bypass valve 14 are controlled by the control unit 21. When, under the control of the control unit 21, the drain cut valve 12 and the purge control valve 11 are both closed and the bypass valve 14 is opened, the fluid (or fuel vapor recovery) passage or space is continuous from the fuel tank 1 to the purge control valve 11, and this continuous fluid passage is closed off in the form of a closed space. In another optional design in which the vacuum cut valve 3 is omitted, there is no need for providing the bypass valve 14. Thus, the valve system including at least the purge control valve 11 and the drain cut valve 12 can put the fluid circuit section formed by the fuel tank 1, the fluid passage 2, the canister 4 and the purge passage 6 in the closed state in which the fluid space is in the form of a closed space.

Figure 3:
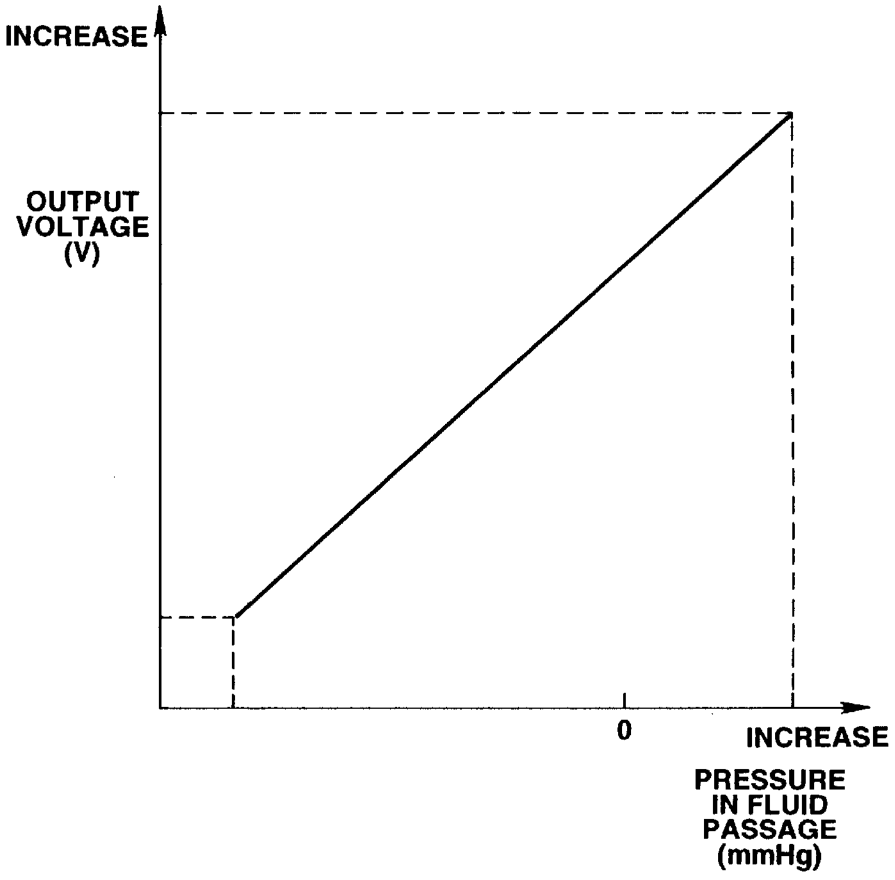
FIG. 3 is a graph showing an output characteristic of a pressure sensor 13 shown in FIG. 1.

A pressure sensor 13 is provided in the fluid passage 2 at a position between the fuel tank 1 and the vacuum cut valve 3. The pressure sensor 13 produces an output voltage which is proportional to the fluid pressure in the passage section between the fuel tank 1 and the vacuum cut valve 3, as shown in FIG. 3. When the fluid passage is closed off from the fuel tank 1 to the purge control valve 11 for the diagnosis, the output voltage of the pressure sensor 13 is proportional to the fluid pressure in the closed circuit (the relative pressure with reference to the atmospheric pressure). It is possible to dispose the pressure sensor 13 at anywhere in the fluid passage between the fuel tank 1 to the purge control valve 11, or within the fuel tank 1.

A water temperature sensor 15 senses the temperature of an engine cooling water.

The control unit 21 is a main component of a diagnostic controller for controlling the valves and performing the diagnosis. The control unit 21 of this example comprises a microcomputer. The control unit 21 checks whether there is leakage in the fluid passage from the fuel tank 1 to the purge control valve 11, by opening or closing the three valves (the purge control valve 11, the drain cut valve 12 and the bypass valve 14).

The control unit 21 of this diagnostic system performs the leak detecting diagnosis in the following manner.

(1) At the time of a stop of the engine, this diagnostic system samples a temperature value of the cooling water temperature and saves the sampled value as T2 in a backup memory. Thereafter, the diagnostic system puts the drain cut valve 12 in the fully closed state, and the bypass valve 14 in the fully open state, and maintains this state of the fluid circuit while the engine is at rest. Therefore, the fluid passage from the fuel tank 1 to the purge control valve 11 is a single continuous closed space. The purge control valve 11 is held in the fully closed state while the engine is at rest.

(2) At the time of a start of the engine, the diagnostic system samples a temperature value of the cooling water temperature as T1, and calculates a temperature variation $\Delta T$ (=T2−T1) of the cooling water temperature from the previous (most recent) engine stop to the current engine start.

(3) The diagnostic system compares the temperature variation $\Delta T$ with a predetermined reference temperature variation value in order to determine whether or not the above-mentioned closed space is in a subatmospheric pressure (negative pressure) state in which the pressure in the closed space is lower than the atmospheric pressure. This decision is based on the following notion.

When the engine is cold at the time of a current start of the engine (that is, in the case of a cold start) because of the elapse of sufficient time from the previous stop of the engine, the temperature variation $\Delta T$ exceeds the reference value. In this case, part of the fuel vapor existing in the fuel passage from the fuel tank 1 to the purge control valve 11 condenses onto the wall surfaces of the fuel tank 1 and the fluid passage during the off period of the engine. The condensation of the fuel vapor into the liquid state in the closed space makes the pressure in the closed space lower than the atmospheric pressure. Therefore, the closed space is in the lower-than-atmospheric pressure state (or the negative pressure state) at the time of the current start of the engine when the engine cools down sufficiently by the time of the start.

When the time from the previous stop is short and the engine does not cool down sufficiently (as in a hot restart), the temperature variation $\Delta T$ becomes equal to or lower than the predetermined reference value. In this case, the amount of the condensation from fuel vapor to liquid is small, and the reduction in the pressure in the closed space is small. Because of the small pressure variation, the leak diagnosis based on the variation of the pressure in the fluid passage can lead to a misjudgment that there is a leak.

Therefore, the diagnostic system of this example checks the water temperature variation $\Delta T$ to determine whether the closed space is in the negative pressure state. When the temperature variation $\Delta T$ is greater than the reference value, the diagnostic system proceeds to a next step (4) on the assumption that the closed space is in the negative pressure state. When the temperature variation $\Delta T$ is equal to or smaller than the reference value, the diagnostic system considers that the pressure in the closed space is hardly reduced, and terminates the diagnostic process.

(4) When the temperature variation $\Delta T$ is greater than the reference value, the diagnostic system samples a value of the pressure in the fluid passage as P1, and calculates a pressure variation $\Delta P$ from the pressure (the atmospheric pressure, for example) in the fluid passage before the fluid passage is closed off.

The pressure variation $\Delta P$ becomes greater when there is no leak, and smaller when there is a leak in the fluid passage from the fuel tank 1 to the purge control valve 11. Therefore, by comparing the pressure reduction ΔP with a predetermined reference pressure variation value, the diagnostic system can render a decision indicating the existence of a leak when ΔP is smaller than the reference value, and a decision indicating the non-existence of a leak when ΔP is equal to or greater than the reference value.

(5) The diagnostic system opens the drain cut valve 12 and closes the bypass valve 14. Then, the diagnostic system terminates the leak diagnostic process.

Figure 4:
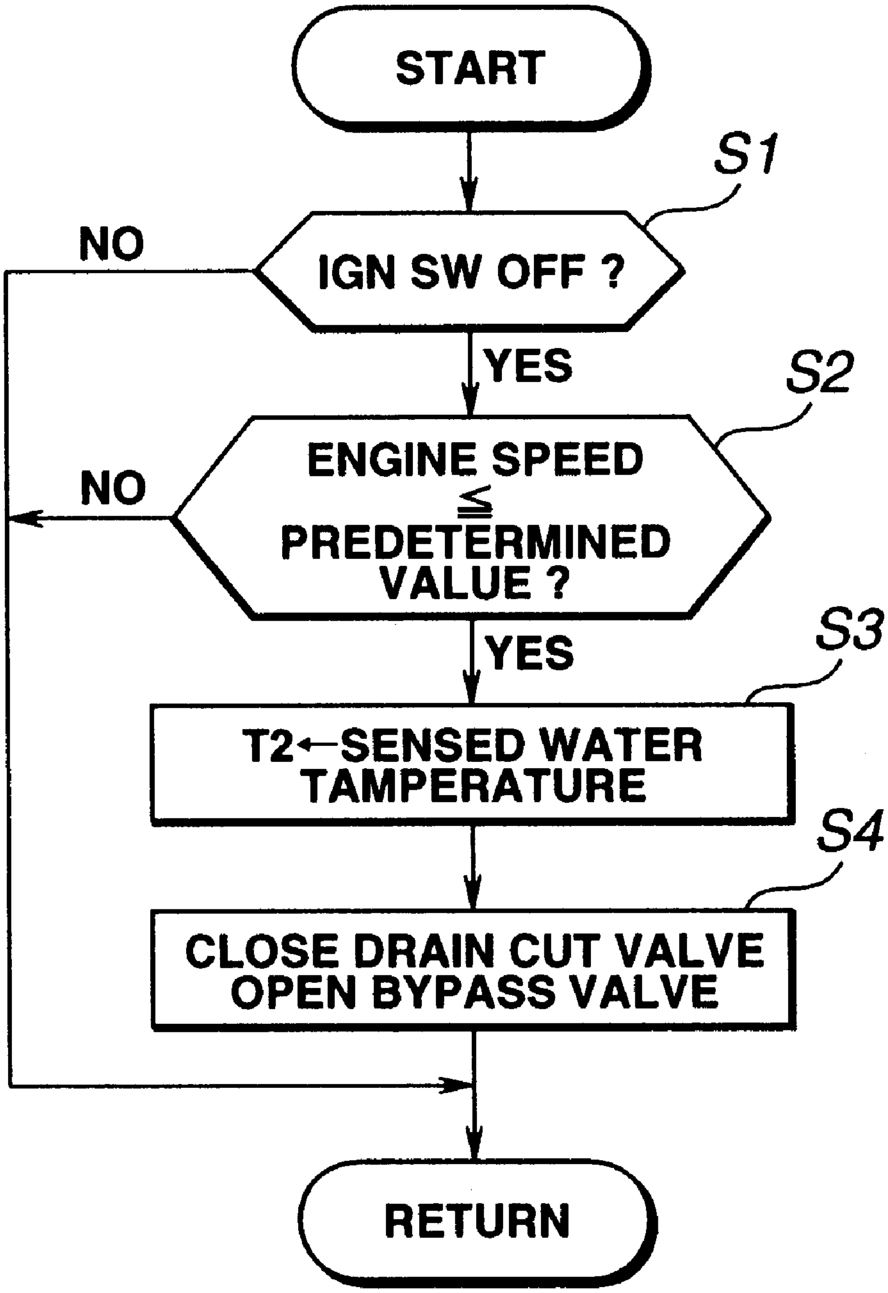
FIG. 4 is a flowchart showing a process which a control unit 21 shown in FIG. 1 performs at the time of an engine stop.
Figure 5:
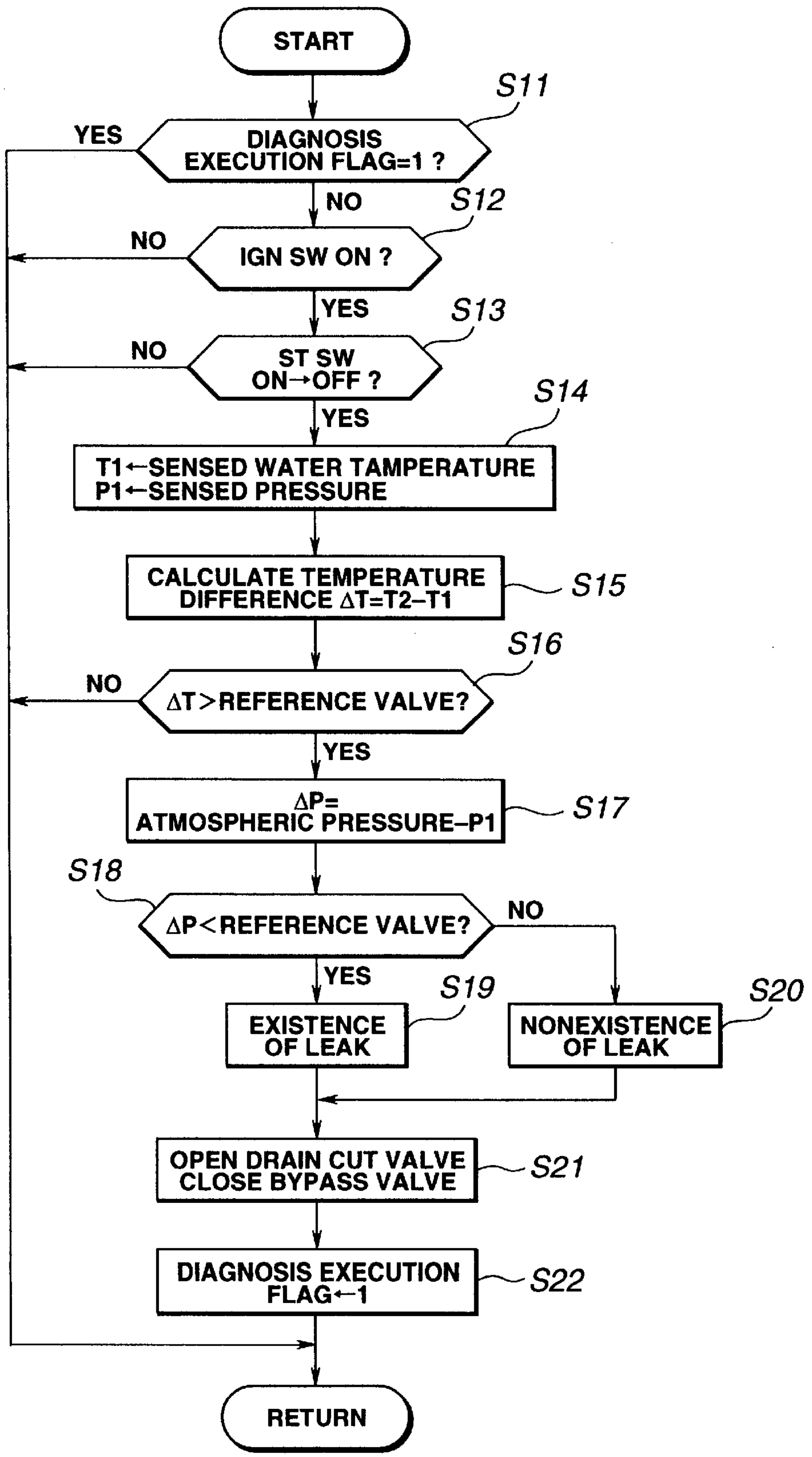
FIG. 5 is a flowchart showing a leak detecting diagnostic process performed by the control unit 21 of FIG. 1.

FIGS. 4 and 5 show the diagnosis the control unit 21 of this example performs. Each of the flows shown in FIGS. 4 and 5 is performed periodically at regular time intervals.

At a step S1 of FIG. 4, the control unit 21 determines whether the ignition switch (IGN SW) is in an off state or not. When the ignition switch is in the off state, the control unit 21 further checks, at a next step S2, whether the engine revolution speed is lower than a predetermined speed. When the ignition switch is off and at the same time the engine speed is lower than the predetermined speed, the control unit 21 judges that the engine is at rest, and proceeds to steps S3 and S4.

At the step S3, the control unit 21 transfers the sensed temperature value of the water temperature sensor 15 to T2 in the backup memory. Then, the control unit 21 fully closes the drain cut valve 12 and opens the bypass valve 14. While the engine is at rest, the control unit 21 holds the fluid circuit in this state in which the drain cut valve 12 is fully closed, and the bypass valve 14 is fully open. During this, the purge control valve 11 is held in the fully closed state.

In the process of FIG. 5, the control unit 21 first checks a diagnosis execution flag at a step S11. The diagnosis execution flag is a condition code set to one when the leak diagnostic process is finished after the start of the current operation of the engine. When the diagnostic process is not finished yet after the start of the engine, and hence the diagnosis execution flag is zero, the control unit 21 proceeds to steps S12 and S13.

At the step S12, the control unit 21 checks whether the ignition switch is in the on state. If it is, the control unit 21 further checks the condition of a starter switch (ST SW) at the step S13. When the ignition switch is in the on state, and at the same time the starter switch has been just turned from the on state to the off state (that is, the time immediately after a start of the engine), then the control unit 21 proceeds to a step S14, and transfers the sensed values of the water temperature sensor 15 and the pressure sensor 13, respectively, to T1 and P1.

At a step S15 following the step S14, the control unit 21 calculates the temperature variation ΔT (=T2−T1) of the cooling water temperature from the previous engine stop. Then, the control unit 21 compares the temperature variation ΔT with the predetermined reference temperature variation value, at a step S16.

When the temperature variation ΔT is greater than the reference value, the control unit 21 judges that this starting operation is a cold start and that the closed space is in the negative pressure state, and proceeds to a step S17. When the temperature variation ΔT is equal to or smaller than the reference value, the control unit 21 judges that this starting operation is a hot restart and that the diagnosis is unfeasible, and terminates this process.

At the step S17, the control unit 21 calculates the pressure decrease ΔP of the fluid pressure in the fluid passage, from the atmospheric pressure. That is, the temperature decrease ΔP is equal to the difference resulting from subtraction of P1 from the atmospheric pressure. Then, at a step S18, the control unit 21 compares the pressure decrease ΔP with the predetermined reference pressure variation value. When the pressure decrease ΔP is equal to or greater than the reference pressure variation value, the control unit 21 proceeds to a step S20 and judges that there is no leak. When the pressure decrease ΔP is smaller than the reference pressure variation value, the control unit 21 proceeds to a step S19 and judges, at the step S19, that there is a leak.

Thereafter, the control unit 21 opens the drain cut valve 12 and closes the bypass valve 14 at a step S21 (while on the other hand the purge control valve 11 is held in the fully closed state). At a step S22 following the step S21, the control unit 21 sets the diagnosis execution flag to one to omit execution of the steps S12 S22 from then on.

According to the illustrated embodiment, the purge control valve 11 is held closed during the leak detecting diagnostic operation. The closed purge control valve 11 prevents the inflow of the fuel from the fuel vapor recovery passage into the intake passage 8 of the engine, and thereby prevents the air fuel ratio of the engine from being disturbed by the diagnostic operation.

The diagnostic system according to the illustrated embodiment can properly perform the leak detecting diagnostic operation before a start of the feedback air fuel ratio control. There is no need for waiting for a start of the feedback air fuel ratio control, and the diagnostic system can carry out the diagnostic operation immediately without delay after a start of the engine.

The decrease of the pressure to a negative pressure is effected during the off period of the engine. The process of decreasing the pressure to the negative pressure is complete at the time of an engine start. Therefore, the diagnostic system can complete the diagnostic operation almost instantaneously.

Figure 6:
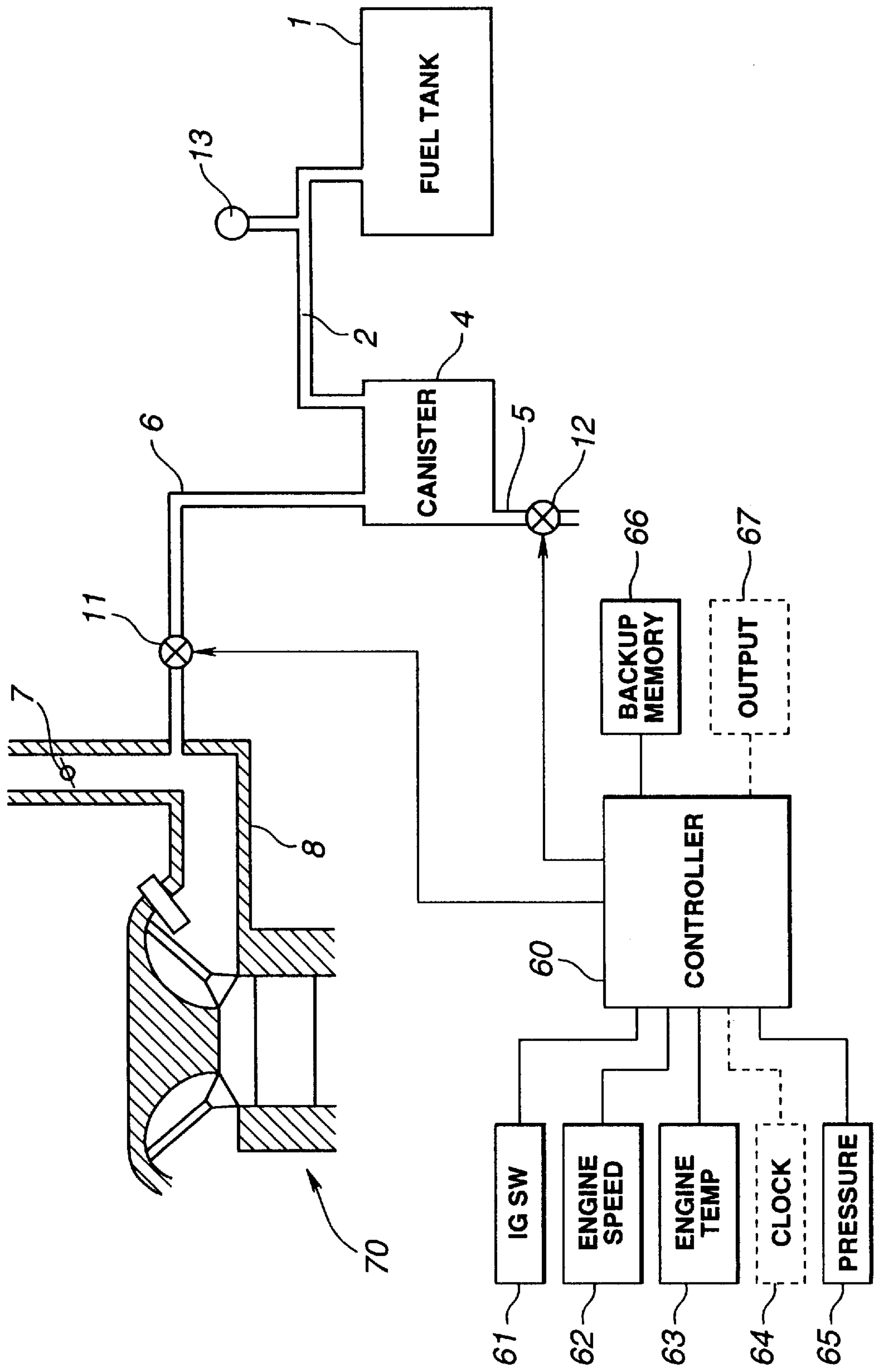
FIG. 6 is a schematic view showing input devices and other devices which the control system of FIG. 1 can employ.

FIG. 6 schematically shows various input and output devices which can be employed in the emission control system according to the embodiment. In the example of FIG. 6, all the components are installed in a motor vehicle equipped with an engine 70. The input devices are; a vehicle main switch 61 such as the ignition switch, an engine speed sensor 62 such as a crankshaft revolution sensor, an engine temperature sensor 63 such as a temperature sensor for sensing the temperature of the coolant in the engine water jacket, and a pressure sensor 65 such as the pressure sensor 13 shown in FIG. 1. There may be further provided a time measuring device 64 such as a clock for measuring time, instead of or in addition to the temperature sensor 63. A controller 60 (comprising a control unit such as the control unit 21 shown in FIG. 1) receives information on engine operating conditions from these input devices. With the time measuring device 64, the controller 60 can determine an elapsed time from a stop of the engine to a next start of the engine, that is the time interval of the off period of the engine. In the illustrated example of FIGS. 1–5, the controller comprises holding means (corresponding to the step S4) for setting the fuel vapor recovery passage extending from the fuel tank 1 through the first passage 2, the canister 4 and the second passage 6 to the purge control valve 11 in a closed state at a time of an engine stop and holding the fuel vapor recovery passage in the closed state during an off period of the engine. The controller further comprises diagnosing means (corresponding to the steps S18–S20) for detecting leakage in the fuel vapor recovery passage at an end of the off period of the engine, by checking a pressure decrease ΔP in the closed fuel vapor recovery passage. The controller may deliver a diagnostic signal representing the result of the diagnosis to an output device 67 (see FIG. 6) such as a warning device, a control system or a fail safe system. In the example of FIGS. 1–5, the sensed temperature is saved in a memory 66 (see FIG. 6) such as the backup memory (at the step S3).

In the illustrated embodiment, the diagnostic system monitors a parameter, such as ΔT or the elapsed time from a last engine stop, indicative of the degree of cooling of the engine during the engine off period or indicative of the amount of condensation of fuel vapor, to quit the diagnostic judgement if the parameter is equal to or smaller than a predetermined reference parameter value.

This application is based on a Japanese Patent Application No. 10-107856. The entire contents of the Japanese Patent Application No. 10-107856 with a filing date of Apr. 17, 1998 are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A diagnostic apparatus for an evaporative emission control system, the diagnostic apparatus comprising:

a first passage conveying evaporative fuel vapor from a fuel tank to a canister;

a second passage extending between the canister and an intake passage section downstream of a throttle valve;

a purge control valve opening and closing the second passage;

a drain cut valve opening and closing an atmospheric port of the canister;

a pressure sensor sensing a pressure in a fluid passage from the fuel tank to the purge control valve; and a controller holding the fluid passage from the fuel tank to the purge control valve in a state of a closed space by closing the purge control valve and the drain cut valve when an engine is out of operation, and performing a leak diagnosis by checking a pressure decrease due to condensation of the fuel vapor in the fluid passage held in the state of a closed space when the engine is started.

2. The diagnostic apparatus as claimed in claim 1 wherein the controller measures a temperature variation of an engine cooling water temperature from a previous engine stop to a current engine start, and inhibits the leak diagnosis when the temperature variation is equal to or smaller than a predetermined reference temperature variation value.

3. The diagnostic apparatus as claimed in claim 1 wherein the controller measures an elapsed time from a previous engine stop to a current engine start, and inhibits the leak diagnosis when the elapsed time is equal to or smaller than a predetermined time interval value.

4. The diagnostic apparatus as claimed in claim 1 wherein the controller comprises a valve controlling section for holding the fluid passage from the fuel tank to the purge control valve in the state in which the fluid passage is in a form of a closed space, by holding the purge control valve and the drain cut valve in a fully closed state during an off period of the engine during which the engine is at rest, and a diagnosing section for comparing the pressure decrease with a predetermined reference pressure decrease value, and producing a diagnostic signal indicating existence of a leak in the fluid passage when the pressure decrease is smaller than the reference pressure decrease value.

5. An evaporative emission control system comprising:

a fuel tank for storing fuel for an engine;

a canister;

a first passage conveying evaporative fuel vapor from the fuel tank to the canister;

a second passage extending from the canister to an intake passage of the engine;

a valve system for putting a fuel vapor recovery passage defined by the fuel tank, the first passage, the canister and the second passage in a closed state in which the fuel vapor recovery passage is in a state of a closed space;

a pressure sensor sensing a fluid pressure in the vapor recovery passage; and a diagnostic controller for holding the vapor recovery passage in the closed state by controlling the valve system during an off period of the engine, for determining a first pressure value of the fluid pressure sensed by the pressure sensor at a start of the engine, for calculating, from the first pressure value, a pressure decrease due to condensation of the fuel vapor in the vapor recovery passage held in the closed state during the off period of the engine, and for producing a leak diagnostic signal indicating existence of a leak in the vapor recovery passage when the pressure decrease is smaller than a predetermined pressure decrease value.

6. The evaporative emission control system as claimed in claim 5 wherein the canister comprises an atmospheric port for admitting atmospheric air into the canister, the valve system comprises a purge control valve for closing the second passage, and a drain cut valve for closing the atmospheric port of the canister, and the diagnostic controller puts the vapor recovery passage in the closed state to hermetically seal the vapor recovery passage by putting the purge control valve and the drain cut valve in a fully closed state when the engine stops.

7. The evaporative emission control system as claimed in claim 6 wherein the evaporative emission control system further comprises an input device for supplying information on an engine operating condition to the controller; the controller monitors the engine operating condition and produces an engine stop signal when the engine stops and an engine start signal when the engine starts; the controller brings the valve system to a state to hold the vapor recovery passage in the closed state in response to the stop signal; and the controller determines the first pressure value by reading the pressure sensed by the pressure sensor upon receipt of the start signal, calculates the pressure decrease which is a difference between an atmospheric pressure and the first pressure value, and produces the leak diagnostic signal indicating the existence of a leak in the vapor recovery passage when the pressure decrease is smaller than the predetermined pressure decrease value.

8. The evaporative emission control system as claimed in claim 6 wherein the controller inhibits a diagnostic judgement based on the pressure decrease when the engine is restarted before the engine cools down.

9. The evaporative emission control system as claimed in claim 8 wherein the controller inhibits the diagnostic judgement based on the pressure decrease when a parameter indicative of a degree of cooling of the engine during the off period is equal to or smaller than a predetermined reference parameter value.

10. The evaporative emission control system as claimed in claim 9 wherein the parameter is a temperature decrease by which a temperature of the engine decreases during the off period of the engine.

11. The evaporative emission control system as claimed in claim 10 wherein the control system further comprises a temperature sensor for sensing the temperature of the engine, and the controller receives an engine temperature signal from the temperature sensor to determine the temperature decrease which is a difference between a second temperature value sensed by the temperature sensor at a time of an engine stop and a first temperature value sensed by the temperature sensor at a time of an engine start.

12. The evaporative emission control system as claimed in claim 9 wherein the parameter is a time length of the off period of the engine.

13. An evaporative emission control system comprising:

a first passage conveying evaporative fuel vapor from a fuel tank to a canister;

a second passage extending from the canister to an intake passage;

a valve system for putting an evaporative fuel vapor recovery passage formed by the fuel tank, the first passage, the canister and the second passage in a closed state in which the vapor recovery passage is in a state of a closed space;

pressure sensing means for sensing a fluid pressure in the vapor recovery passage;

holding means for holding the vapor recovery passage in the closed state by controlling the valve system during an off period of the engine; and diagnosing means for determining a pressure decrease in the vapor recovery passage during the off period of the engine by sampling the fluid pressure sensed by the pressure sensor at a start of the engine, and for producing a leak diagnostic signal indicating existence of a leak in the vapor recovery passage when the pressure decrease is smaller than a predetermined pressure decrease value.

14. A diagnostic process for an evaporative emission control system comprising a first passage conveying evaporative fuel vapor from a fuel tank to a canister, and a second passage extending from the canister to an intake passage for an engine, the diagnostic process comprising:

holding a fuel vapor recovery passage extending from the fuel tank through the canister to the second passage in a closed state to confine fuel vapor in the fuel vapor recovery passage during an off period of the engine; and detecting leakage in the fuel vapor recovery passage at an end of the off period by checking a pressure decrease in the fuel vapor recovery passage held in the closed state during the off period.

15. The diagnostic process as claimed in claim 14, further comprising:

inhibiting a diagnostic judgment based on the pressure degrease in the fuel vapor recovery passage when the off period of the engine ends with a restart of the engine before the engine cools down.

* * * * *